United States Patent
Miyauchi (10) Patent No.: US 12,306,964 B2
(45) Date of Patent: May 20, 2025

(54) ENCRYPTION APPARATUS AND METHOD, DECRYPTION APPARATUS AND METHOD, SYSTEM, NEURAL NETWORK LEARNING METHOD, AND STORAGE MEDIUM

(71) Applicant: CANON KABUSHIKI KAISHA, Tokyo (JP)

(72) Inventor: Dai Miyauchi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 212 days.

(21) Appl. No.: 18/173,846

(22) Filed: Feb. 24, 2023

(65) Prior Publication Data

US 2023/0281325 A1 Sep. 7, 2023

(30) Foreign Application Priority Data

Mar. 3, 2022 (JP) .................. 2022-032811

(51) Int. Cl.
*H04L 29/06* (2006.01)
*G06F 21/60* (2013.01)
*G06N 3/04* (2023.01)

(52) U.S. Cl.
CPC ............ *G06F 21/602* (2013.01); *G06N 3/04* (2013.01)

(58) Field of Classification Search
CPC .............. G06F 21/602; G06F 21/6209; H04L 63/0457; H04L 63/108; H04L 63/20; H04L 63/0263
USPC ......................................... 726/26
See application file for complete search history.

(56) References Cited

U.S. PATENT DOCUMENTS

| | | | | |
|---|---|---|---|---|
| 6,154,541 | A | * 11/2000 | Zhang | H04L 9/3073 380/287 |
| 10,116,442 | B2 | * 10/2018 | Mori | H04L 9/30 |
| 10,552,583 | B2 | * 2/2020 | Piccionelli | G06F 21/10 |
| 2023/0267723 | A1 | 8/2023 | Komatsu | |
| 2023/0274530 | A1 | 8/2023 | Kaneko | |

FOREIGN PATENT DOCUMENTS

| | | | |
|---|---|---|---|
| CN | 1284394 | * | 11/2006 |
| CN | 112364364 | * | 2/2021 |
| CN | 110941855 | * | 2/2022 |
| JP | 2021-131725 A | | 9/2021 |

* cited by examiner

*Primary Examiner* — Longbit Chai
(74) *Attorney, Agent, or Firm* — Carter, DeLuca & Farrell LLP (57) ABSTRACT

An encryption apparatus comprises an encryption unit that encrypts encryption target data which is subjected to encryption using a neural network which is learned in advance and encryption key data, and generates encrypted data.

12 Claims, 9 Drawing Sheets

ENCRYPTION APPARATUS AND METHOD, DECRYPTION APPARATUS AND METHOD, SYSTEM, NEURAL NETWORK LEARNING METHOD, AND STORAGE MEDIUM

BACKGROUND OF THE INVENTION

Field of the Invention

The present invention relates to an encryption apparatus and method, a decryption apparatus and method, a system, a neural network learning method, and a storage medium, and more particularly to techniques for encryption processing and decryption processing using a neural network.

Description of the Related Art

Deep learning technology using neural networks is applied in a wide range of technical fields, and in particular, some say that class classification, which recognizes and classifies images, has surpassed the recognition ability of human. Especially, a convolutional neural network (CNN)), which is particularly widely used, can realize highly accurate deep learning processing by recursively applying a convolution operation to an image.

On the other hand, in recent years, as social networking services (SNS) have become popular, the security of data such as images has been attracting interest. For example, in services such as SNS that share data, data communication from the edge terminal to the cloud server is indispensable, and from the viewpoint of privacy protection, it is common to encrypt data before sending it.

Neural networks have come to be used for such security measures as well, and, for example, there is a method of anonymizing an image by performing image conversion on image data. However, a simple neural network anonymization method that performs the same processing on any input image does not always meet the user's desire to anonymize images.

Accordingly, Japanese Patent Laid-Open No. 2021-131725 discloses a technique for anonymizing an image by selecting an anonymization model from a plurality of anonymization processing patterns according to the type of an image to be anonymized. According to this technique, the degree of confidentiality can be increased by changing the pattern of image anonymization according to the user's selection.

However, in a case of using the technique disclosed in Japanese Patent Laid-Open No. 2021-131725, it is necessary to hold a plurality of neural network models, which greatly increases an amount of data of neural network models to be used for anonymization.

SUMMARY OF THE INVENTION

The present invention has been made in consideration of the above situation, and in data anonymization using a neural network, the degree of confidentiality of data to be anonymized is improved without increasing an amount of data of neural network models.

According to the present invention, provided is an encryption apparatus comprising one or more processors and/or circuitry which function as: an encryption unit that encrypts encryption target data which is subjected to encryption using a neural network which is learned in advance and encryption key data, and generates encrypted data.

Furthermore, according to the present invention, provided is a learning method of a neural network used in an encryption apparatus that includes one or more processors and/or circuitry which function as an encryption unit that encrypts encryption target data which is subjected to encryption using the neural network and encryption key data, and generates encrypted data, the method comprising: encrypting each of a plurality of learning data which are the encryption target data using one or more of predetermined encryption key data, preparing training data for each combination of the learning data and the encryption key data, and performing learning so that encrypted data corresponding to each combination approaches the training data prepared for the corresponding combination.

Further, according to the present invention, provided is a learning method of a neural network used in an encryption apparatus that includes one or more processors and/or circuitry which function as an encryption unit that encrypts encryption target data which is subjected to encryption using the neural network and encryption key data, and generates encrypted data, the method comprising: encrypting each of a plurality of learning data which are the encryption target data using a combination of a first key and a second key which is different from the first key among a plurality of predetermined encryption key data, and preparing training data that is equivalent to data obtained by decrypting encrypted data which is encrypted by the encryption unit using the first key with respect to each of the plurality of learning data; performing learning so that the encrypted data of each learning data approaches the corresponding training data in a case where the first key is used; and performing learning so that the encrypted data of each learning data departs from the corresponding training data in a case where the second key is used.

Further, according to the present invention, provided is a decryption apparatus that decrypts encrypted data encrypted by an encryption apparatus that includes one or more processors and/or circuitry which function as an encryption unit that encrypts encryption target data which is subjected to encryption using a neural network which is learned in advance and encryption key data, and generates encrypted data, comprising one or more processors and/or circuitry which function as: an input unit that inputs the encrypted data and the encryption key data or information to be used for inferring the encryption key data; and a decryption unit that decrypts the encrypted data using the encrypted data and decryption key data corresponding to the encryption key data.

Further, according to the present invention, provided is a system comprising: an encryption apparatus that includes one or more processors and/or circuitry which function as an encryption unit that encrypts encryption target data which is subjected to encryption using a neural network which is learned in advance and encryption key data, and generates encrypted data; and a decryption apparatus that decrypts the encrypted data encrypted by the encryption apparatus, comprising one or more processors and/or circuitry which function as: an input unit that inputs the encrypted data and the encryption key data or information to be used for inferring the encryption key data; and a decryption unit that decrypts the encrypted data using the encrypted data and decryption key data corresponding to the encryption key data.

Further, according to the present invention, provided is a system comprising: an encryption apparatus that includes one or more processors and/or circuitry which function as: an encryption unit that encrypts encryption target data which is subjected to encryption using a neural network which is learned in advance and encryption key data, and generates encrypted data; and a determination unit that determines the encryption key data, wherein the determination unit determines the encryption key data to be used in the encryption by changing among a plurality of predetermined encryption key data according to a predetermined condition; and a decryption apparatus that decrypts the encrypted data encrypted by the encryption apparatus, comprising one or more processors and/or circuitry which function as: an input unit that inputs the encrypted data and the encryption key data or information to be used for inferring the encryption key data; and a decryption unit that decrypts the encrypted data using the encrypted data and decryption key data corresponding to the encryption key data, wherein the decryption apparatus changes the decryption key data in synchronization with a change of the encryption key data in the encryption apparatus.

Further, according to the present invention, provided is a system comprising: an encryption apparatus that includes one or more processors and/or circuitry which function as an encryption unit that encrypts encryption target data which is subjected to encryption using a neural network which is learned in advance and encryption key data, and generates encrypted data, wherein the encryption unit changes a parameter for the neural network among a plurality of predetermined parameters according to a predetermined condition; and a decryption apparatus that decrypts the encrypted data encrypted by the encryption apparatus, comprising one or more processors and/or circuitry which function as: an input unit that inputs the encrypted data and the encryption key data or information to be used for inferring the encryption key data; and a decryption unit that decrypts the encrypted data using the encrypted data and decryption key data corresponding to the encryption key data, wherein the decryption unit decrypts the encrypted data using a neural network which is learned in advance based on the encrypted data, the decryption key data, and the encryption target data which is not encrypted, wherein timing of changing the parameter used in the neural network in the encryption apparatus and timing of changing a parameter used in the neural network in the decryption apparatus are synchronized with each other.

Further, according to the present invention, provided is a system comprising: an encryption apparatus that includes one or more processors and/or circuitry which function as an encryption unit that encrypts encryption target data which is subjected to encryption using a neural network which is learned in advance and encryption key data, and generates encrypted data; and a decryption apparatus that decrypts the encrypted data encrypted by the encryption apparatus, comprising one or more processors and/or circuitry which function as: an input unit that inputs the encrypted data and the encryption key data or information to be used for inferring the encryption key data; and a decryption unit that decrypts the encrypted data using the encrypted data and decryption key data corresponding to the encryption key data, wherein the encryption unit performs leaning of the neural network using a learning method of a neural network used in the encryption apparatus, the method comprises: encrypting each of a plurality of learning data which are the encryption target data using a combination of a first key and a second key which is different from the first key among a plurality of predetermined encryption key data, and preparing training data that is equivalent to data obtained by decrypting encrypted data which is encrypted by the encryption unit using the first key with respect to each of the plurality of learning data; performing learning so that the encrypted data of each learning data approaches the corresponding training data in a case where the first key is used; and performing learning so that the encrypted data of each learning data departs from the corresponding training data in a case where the second key is used, the encryption unit performs encryption using the second key, and wherein the decryption unit decrypts the encrypted data using the encrypted data and decryption key data corresponding to the second key.

Further, according to the present invention, provided is an encryption method comprising generating encrypted data by encrypting encryption target data which is subjected to encryption using a neural network learned in advance and encryption key data.

Further, according to the present invention, provided is a decryption method for decrypting encrypted data encrypted by an encryption apparatus that includes one or more processors and/or circuitry which function as an encryption unit that encrypts encryption target data which is subjected to encryption using a neural network which is learned in advance and encryption key data, and generates encrypted data, comprising: inputting the encrypted data and the encryption key data or information to be used for inferring the encryption key data; and decrypting the encrypted data using the encrypted data and decryption key data corresponding to the encryption key data.

Further, according to the present invention, provided is a non-transitory computer-readable storage medium, the storage medium storing a program that is executable by the computer, wherein the program includes program code for causing the computer to function as an encryption apparatus comprising an encryption unit that encrypts encryption target data which is subjected to encryption using a neural network which is learned in advance and encryption key data, and generates encrypted data.

Further, according to the present invention, provided is a non-transitory computer-readable storage medium, the storage medium storing a program that is executable by the computer, wherein the program includes program code for causing the computer to function as a decryption apparatus that decrypts encrypted data encrypted by an encryption apparatus that includes one or more processors and/or circuitry which function as an encryption unit that encrypts encryption target data which is subjected to encryption using a neural network which is learned in advance and encryption key data, and generates encrypted data, comprising: an input unit that inputs the encrypted data and the encryption key data or information to be used for inferring the encryption key data; and a decryption unit that decrypts the encrypted data using the encrypted data and decryption key data corresponding to the encryption key data.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Constitution

Figure 1:
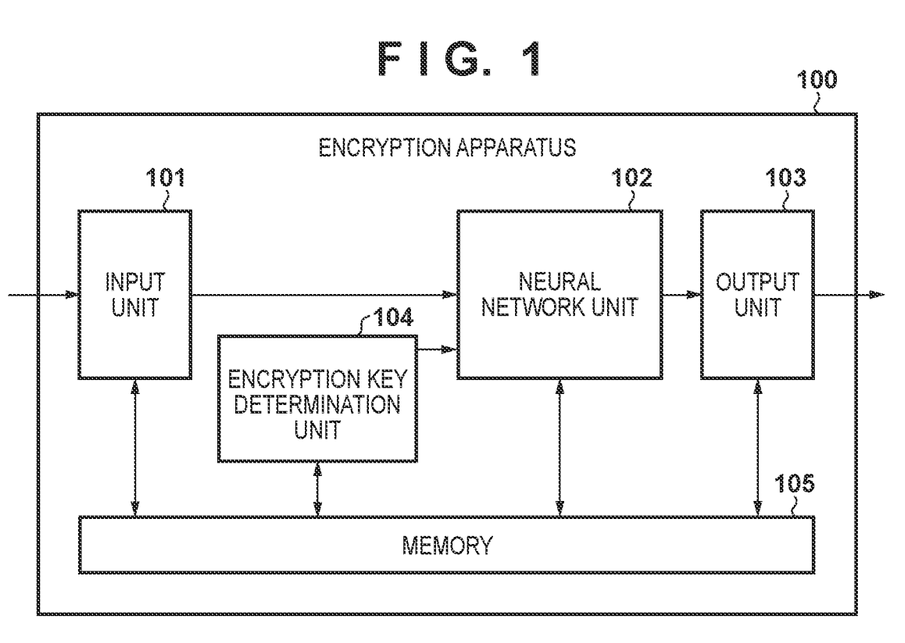
FIG. 1 is a block diagram illustrating an example of a configuration of an encryption apparatus according to a first embodiment of the present invention.

FIG. 1 is a block diagram showing an example of a configuration of an encryption apparatus 100 according to a first embodiment of the present invention. The encryption apparatus 100 encrypts an image captured by a camera, for example, and outputs encrypted data, thereby making privacy information in the image confidential. Since the purpose of the present embodiment is to making data confidential, hereinafter, methods that can make data confidential are collectively referred to as encryption.

An input unit 101 receives encryption target data to be encrypted by the encryption apparatus 100 and transmits the encryption target data to a neural network unit 102. An encryption key determination unit 104 determines encryption key data to be used for the encryption target data, and transmits the encryption key data to the neural network unit 102.

The neural network unit 102 generates encrypted data by performing neural network processing based on the encryption target data and the encryption key data, and transmits the encrypted data to an output unit 103. In this embodiment, the neural network unit 102 is assumed to be a processing unit capable of performing product-sum operation and non-linear processing, which are employed in general neural network models.

The output unit 103 outputs the encrypted data from the encryption apparatus 100. As for the output destination, the encrypted data may be output to a storage via a bus within the apparatus, or may be output to an external device via a communication network such as the Internet.

A memory 105 is a memory capable of storing information related to each process of the encryption apparatus 100, and stores, for example, computation results of the neural network, model parameters used in the neural network, and the like. Further, in this embodiment, each processing unit will be described as directly exchanging data with each other, but the present invention is not limited to this. For example, the input unit 101 may temporarily store the input data in the memory 105, and the neural network unit 102 may perform neural network processing on the data stored in memory 105 as the input data. The same applies to other processing units.

In the following description, the encryption target data to be encrypted by the encryption apparatus 100 is assumed to be a two-dimensional image, but it may be data other than an image.

Neural Network Unit

Figure 2:
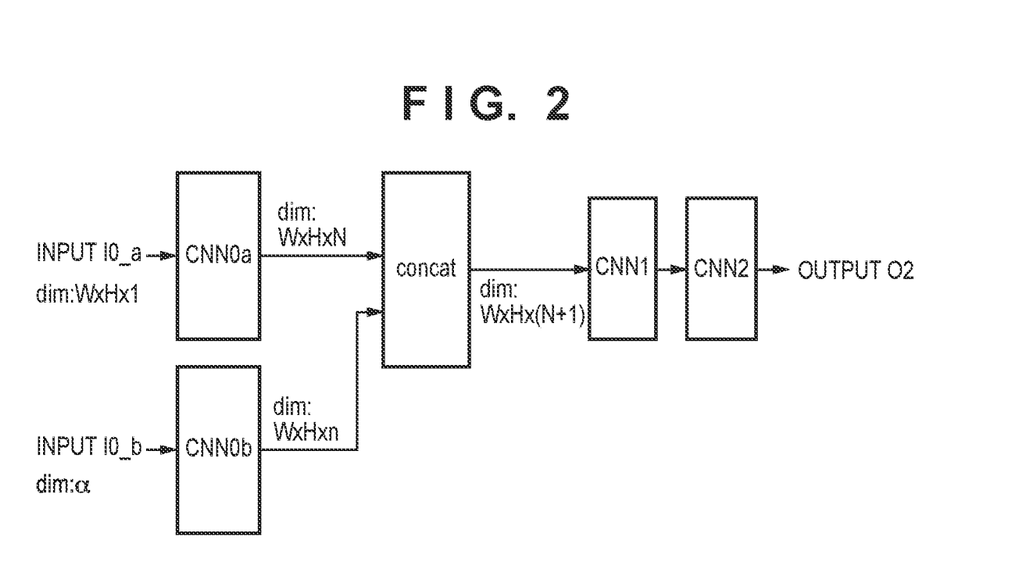
FIG. 2 is a block diagram illustrating an example of a configuration of a neural network unit according to the first embodiment.

FIG. 2 is a block diagram showing an example of a configuration of the neural network unit 102 in this embodiment. In this embodiment, the neural network unit 102 is assumed to be configured with a convolutional neural network (CNN). Although CNN processing generally includes bias addition, non-linear processing, and the like, details thereof are omitted in this embodiment. It should be noted that the configuration of the neural network of the present invention is not limited to CNN, and may include operations such as fully connected processing, for example. Since the computation method of the neural network is a well-known technology, the description thereof is omitted here.

In FIG. 2, CNN<X> indicates a CNN layer, and X indicates a layer number. Also, I and O indicate input data and output data to/from a layer, respectively. For example, O2 indicates output data from the second layer of the CNN. Further, Input I0_a corresponds to an encryption target image, and input I0_b corresponds to the encryption key data. Also, "dim" indicates the number of data in each dimension of data before and after CNN processing.

In this embodiment, as shown in FIG. 2, the encryption target data is three-dimensional and the encryption key data is one-dimensional, however, the present invention is not limited to these, and for example, the input I0_b may be multidimensional data.

Further, in this embodiment, the encryption target data is one image, and the number of data in each dimension of the input I0_a is W"H"1, however, a plurality of images may be input. For example, if five images are input, the number of data in each dimension is W×H×5.

"concat" indicates a concatenation process for two or more data in the dimensional direction. By the concatenation process, if there are two or more data in at least N−1 dimensions, they can be concatenated in the dimension direction, so the same CNN processing can be used in the subsequent process.

As shown in FIG. 2, the neural network unit 102 has input layers to which the encryption target data and encryption key data can be input, and outputs one encrypted data using the "concat" layer or the like as a result.

Neural Network Learning Method

Next, a method of learning parameters used in the neural network unit 102 in this embodiment will be described.

Figure 3:
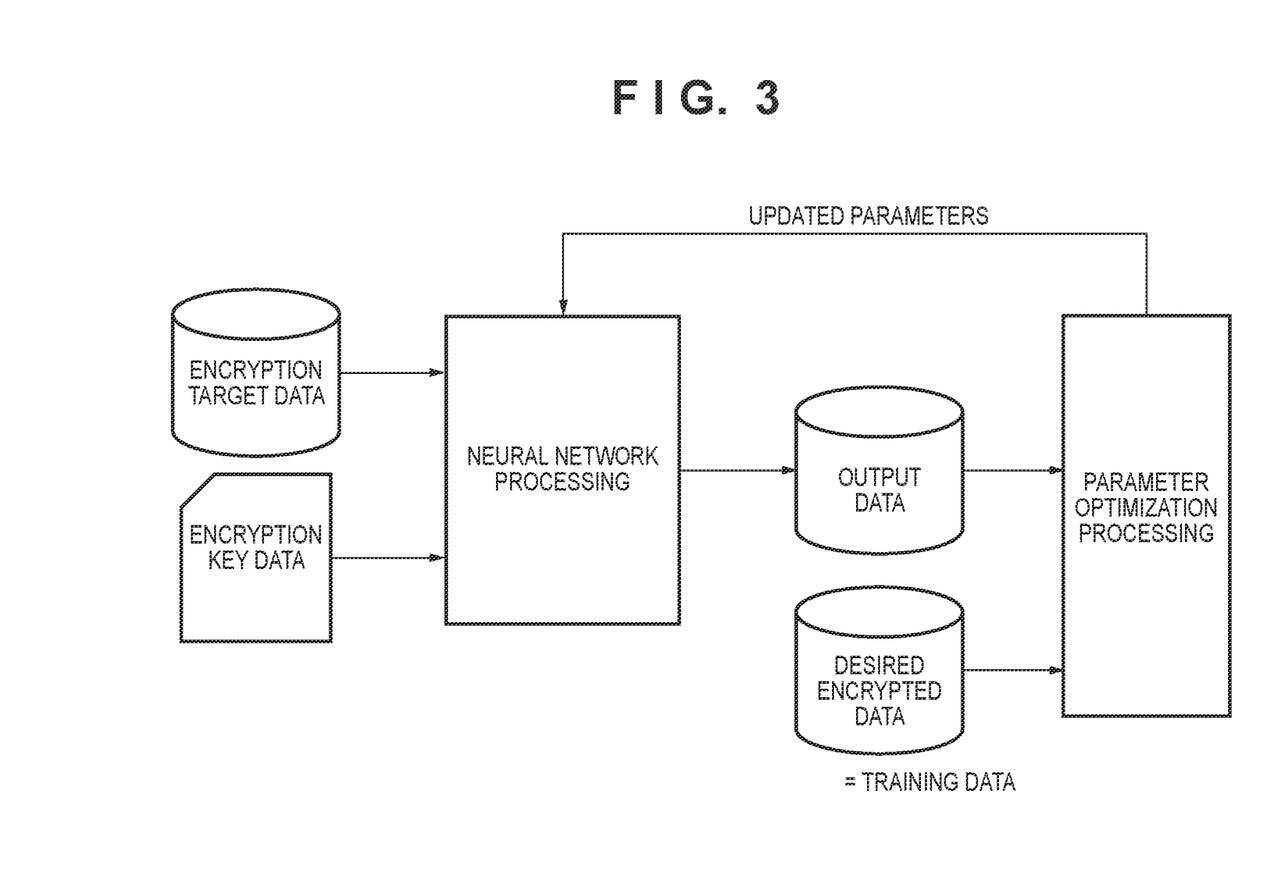
FIG. 3 is a diagram illustrating an example of a learning method of the neural network unit according to the first embodiment.

FIG. 3 is a diagram illustrating the learning method of the neural network unit 102. In this embodiment, it is assumed that parameters used in the neural network unit 102 are learned by another device such as a PC, and acquired in advance.

The neural network illustrated in FIG. 3 is equivalent to the configuration of the neural network used in the neural network unit 102 in FIG. 1, and the parameters used in the encryption apparatus 100 are learned by this learning method. For learning, a plurality of encryption target data and a plurality of encryption key data are prepared. The encryption apparatus 100 can perform different encryptions for the number of encryption key data prepared at this time.

In addition, the encryption method that indicates what kind of encryption is desired for the encryption key data is determined in advance, and training data corresponding to the predetermined encryption method are prepared in combination of learning images and encryption method. One encryption key data is associated with one encryption method.

In learning with the above combination, the encryption target data and the encryption key data are input data, and the training data, which is the desired encrypted data corresponding to the combination of input data, is compared with the output data of the neural network, and the parameters are optimized.

In this learning method, updated parameters updated by parameter optimization processing are generated. As the updated parameters have been determined, the updated parameters are given to the neural network, and learning is performed using the next combination of encryption target data and encryption key data.

The above explanation is the outline of learning. Note that neural network learning algorithms such as error backpropagation are well-known techniques, and thus descriptions thereof will be omitted in the present embodiment.

Figure 4:
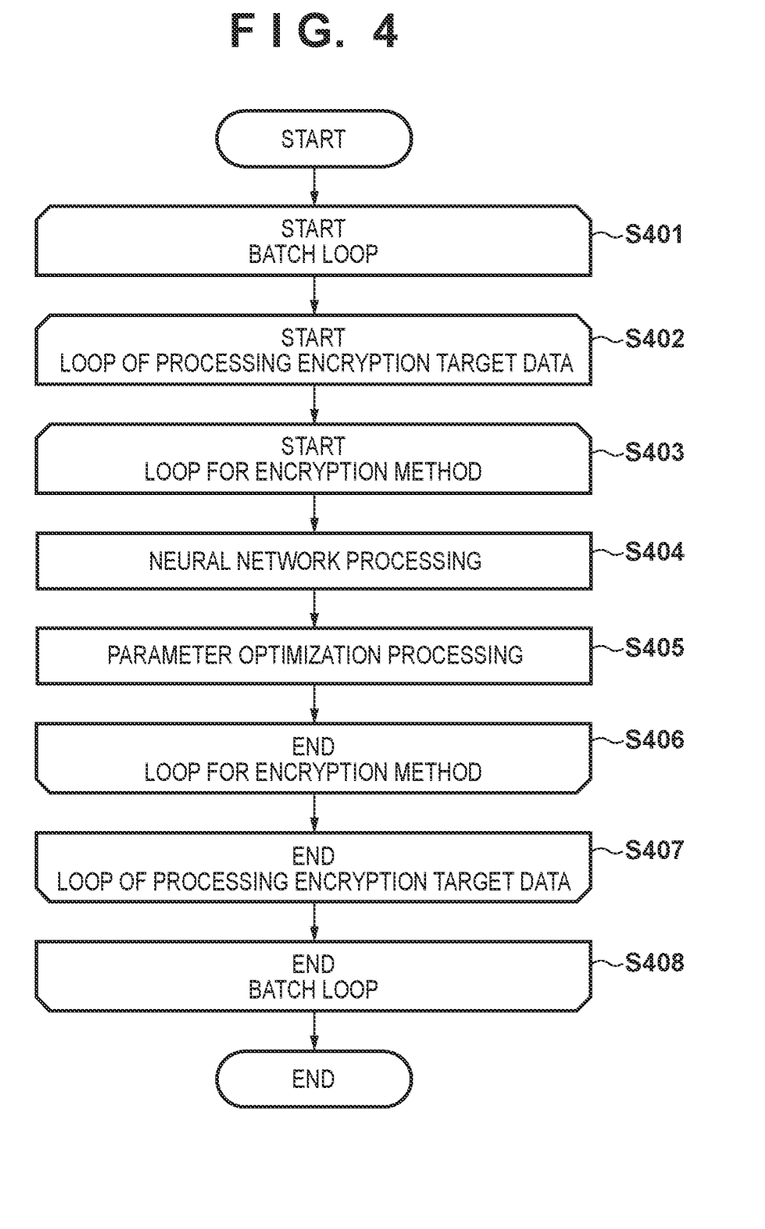
FIG. 4 is a flowchart of a learning method of the neural network unit according to the first embodiment.

FIG. 4 is a flowchart of the learning method in the neural network unit 102 according to this embodiment.

In step S401, a batch processing loop is started. A "batch" is a unit by which learning is performed and which is obtained by dividing all learning images (a plurality of learning data) into a predetermined number of images. By repeating batch learning, the accuracy of the output data improves, that is, in this embodiment, the output result of the neural network approaches the desired encrypted data.

In step S402, a loop of processing encryption target data is started. In step S403, a processing loop for the encryption method is started. In step S404, neural network processing is performed for the corresponding batch by using corresponding encryption target data and corresponding encryption method. In step S405, parameter optimization processing is performed for the corresponding batch based on the output data obtained by using corresponding encryption target data and the corresponding encryption method and the training data.

In step S406, when the processing of all encryption methods is completed, the processing loop for the encryption method ends. In step S407, when the processing of all the encryption target data is completed, the loop of processing the encryption target data ends. In step S408, when all batches have been processed, the batch processing loop ends.

As described above, it is possible to learn parameters used in a neural network that performs encryption processing corresponding to predetermined encryption key data.

Note that the number of parameter set used in the neural network and generated in this embodiment does not have to be one. For example, one parameter set may be generated for units of encryption key data that correspond to similar encryption methods, and different parameter sets may be generated for a plurality of encryption key data that correspond to significantly different encryption methods.

Specifically, the encryption methods to be included in the loop for encryption method (loop of step S403) in FIG. 4 may be grouped, and a parameter set may be generated for each group. By doing so, the number of learning objects to be learned with one parameter set can be reduced, which makes it easier to generate highly accurate parameters.

Note that there is no limit to the grouping, and methods ranging from a method of preparing one parameter set for each encryption key data to a method of preparing one parameter set for all encryption key data are within the scope of this embodiment. However, it should be noted that an increase in the number of parameter sets causes an increase in the data amount of parameters required for the neural network.

Encryption Key Data

In this embodiment, the encryption apparatus 100 performs encryption processing corresponding to the encryption key data determined by the encryption key determination unit 104. As an example of the encryption processing, a process of blurring an image, for example, a process of subjectively outputting a mosaic-like image is one encryption processing. It is possible to configure a neural network that inputs encryption key data for mosaicking and outputs mosaicked encrypted data by preparing a data string to be used as the encryption key data for mosaicking in advance, and performing learning by using mosaicked images obtained by mosaicking encryption target images in advance as training data.

Therefore, it is possible to configure a neural network that performs one of a plural kinds of mosaicking processing by changing the encryption key data, by preparing a data string to be used as encryption key data in advance for each of the plural kinds of mosaicking processing, and performing learning by using data obtained by mosaicking the data string for each mosaicking processing in association with encryption key data. In addition, encryption key data or the like corresponding to an encoding algorithm used for image compression encoding may be prepared.

Also, the purpose of this embodiment is to protect privacy. Since the CNN used in the neural network in this embodiment excels in extracting the features of an image, it is good at performing image processing according to the features of the image and encrypting it for confidentiality, and can increase the number of variations of the encryption key data with respect to image processes.

Figure 5A:
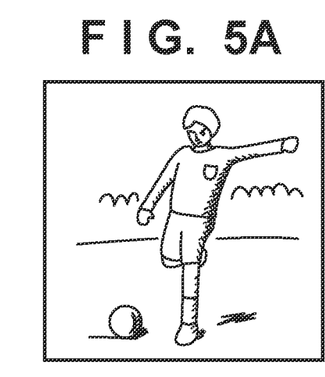
FIGS. 5A to 5C are diagrams illustrating examples of encryption processing targets in a case where encryption is performed by image processing according to the first embodiment.
Figure 5B:
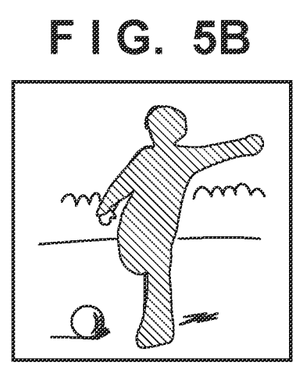
Figure 5C:
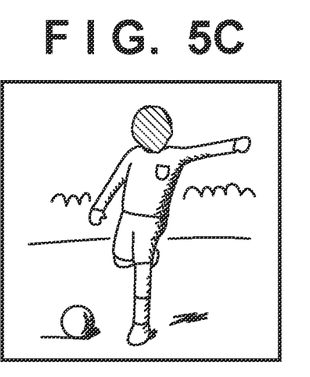

FIGS. 5A to 5C show examples of encryption processing targets when encryption is performed by image processing according to this embodiment.

FIG. 5A shows an input image, FIG. 5B shows an encryption processing target when the whole person is to be anonymized, and FIG. 5C shows an encryption processing target when the face part is to be anonymized. In this embodiment, learning is performed so as to have an encryption key data that abstracts the entire human body as shown in FIG. 5B and an encryption key data that partially abstracts only the face as shown in FIG. 5C. By doing so, even with the same neural network, the anonymization method can be changed only by changing the encryption key data.

Note that FIGS. 5A to 5C only show portions of processing target and, in actual encryption processing, for example, image processing such as the above-described mosaicking is performed with certain information being secured for decoding.

As described above, according to the first embodiment, a neural network using encryption key data as input in addition to encryption target data is configured. As a result, it is possible to handle a plurality of encryption methods simply by changing the encryption key data, and reduce an data amount of the neural network models used for anonymization.

Second Embodiment

Next, a second embodiment of the present invention will be described. Since the encryption apparatus 100 according to the second embodiment is the same as that of FIG. 1, the description thereof is omitted here. A different point from the first embodiment is the configuration of the input layer of the neural network.

Figure 6:
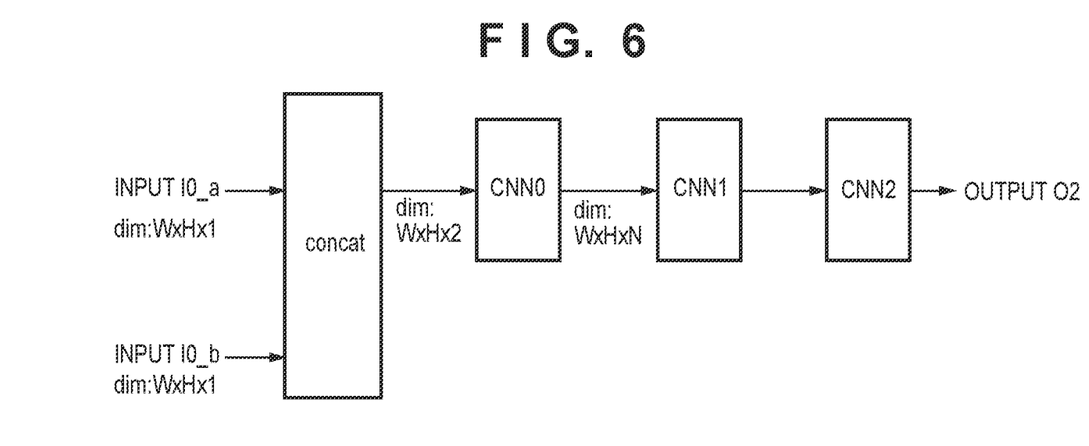
FIG. 6 is a block diagram illustrating an example of a configuration of a neural network unit according to a second embodiment.

FIG. 6 is a diagram showing an example of a configuration of the neural network unit 102 according to the second embodiment. As described above with reference to FIG. 2, in the first embodiment, the numbers of dimensions of encryption target data and encryption key data are different. On the other hand, in this embodiment, encryption key data is prepared so that input I0_a as encryption target data and input I0_b as encryption key data have the same dimensions. By doing so, as shown in FIG. 6, the data can be concatenated into one before the CNN processing.

In the first embodiment, since there are two input layers, CNN processing for adjusting the dimensions of inputs is required so that data is concatenated during neural network processing, and because of this adjustment of dimensions, it is difficult to increase the accuracy of neural network. The accuracy of the neural network shown here indicates the matching rate between the output data of the encryption apparatus 100 and the training data generated using the encryption method of interest, and the higher the accuracy is, the closer the output data to the desired encrypted data can be generated at the time of learning.

As in this embodiment, by making the numbers of dimensions of the encryption target data and the encryption key data be the same in advance, and making the number of input layer be one (single layer), it becomes unnecessary to adjust dimensions. As a result, it is possible to configure the encryption apparatus 100 with a high degree of confidentiality.

Note, the concatenation processing in FIG. 6 may be performed within the neural network unit 102, or the encryption target data and the encryption key data may be arranged consecutively in advance in the memory 105 and input to the neural network unit 102 as one piece of data.

As described above, according to the second embodiment, more accurate encryption processing can be performed.

Third Embodiment

Next, a third embodiment of the present invention will be described. Since the encryption apparatus 100 according to the third embodiment is the same as that of FIG. 1, the description thereof is omitted here. A different point from the first embodiment is that the neural network unit 102 performs computations that also serve as processing other than encryption processing using a neural network.

Figure 7:
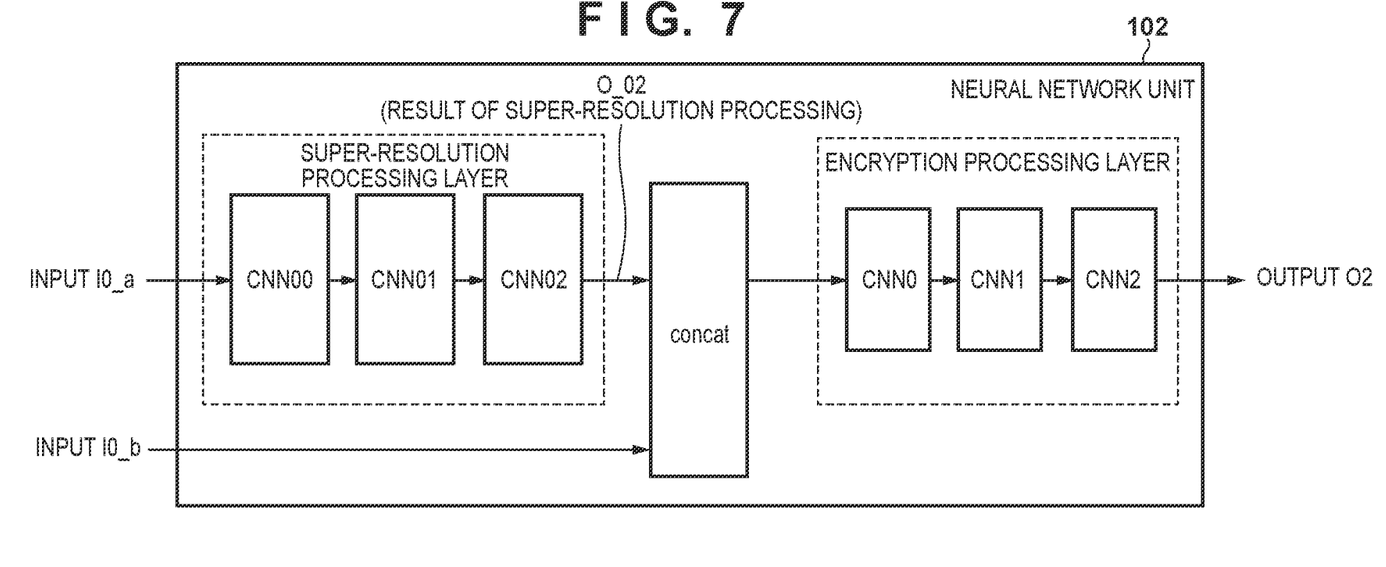
FIG. 7 is a block diagram illustrating an example of a configuration of a neural network unit according to a third embodiment.

FIG. 7 is a diagram showing an example of a configuration of the neural network unit 102 according to the third embodiment. FIG. 7 shows an example in which super-resolution processing is performed in the first half of processing by a neural network, and encryption processing is performed in the latter half. The neural network unit 102 can perform various CNN processing by using pre-trained parameters, so regardless of super-resolution processing, processing other than encryption may be easily added in the course of encryption processing performed by the encryption apparatus 100.

By doing so, it is possible to perform neural network processing different from that performed by the encryption apparatus without using a processing device different from the encryption apparatus. Accordingly, a process different from the encryption processing and the encryption processing can be performed together without unnecessary processing overhead.

Although super-resolution processing is taken as an example of processing different from the encryption processing, the present invention is not limited to this, and other processing such as person detection may be performed. Also, the encryption apparatus 100 does not have to perform all of the super-resolution processing. For example, a configuration of neural network may be such that only part of the super-resolution processing (for example, the first half layer) may be performed by the encryption apparatus 100.

In FIG. 7, a neural network is explained such that the super-resolution processing layer is in the first half layer and the encryption processing layer is in the latter half layer, however, the present invention is not limited to this, and those from which output data that have undergone the super-resolution processing and the encryption processing can be obtained may be used. For example, during learning, the super-resolution processing is applied to input data of the encryption apparatus 100, the generated data that have undergone the super-resolution processing is subjected to the encryption processing, and learning of the neural network is performed using the resultant data as training data. By doing so, it is possible to generate a neural network model without the concept of divided layers of the first half layer and the latter half layer as described above.

Fourth Embodiment

Next, a fourth embodiment of the present invention will be described. Since the encryption apparatus 100 according to the fourth embodiment is the same as that of FIG. 1, the description thereof is omitted here. A different point from the first embodiment is the learning method of the neural network.

Figure 8:
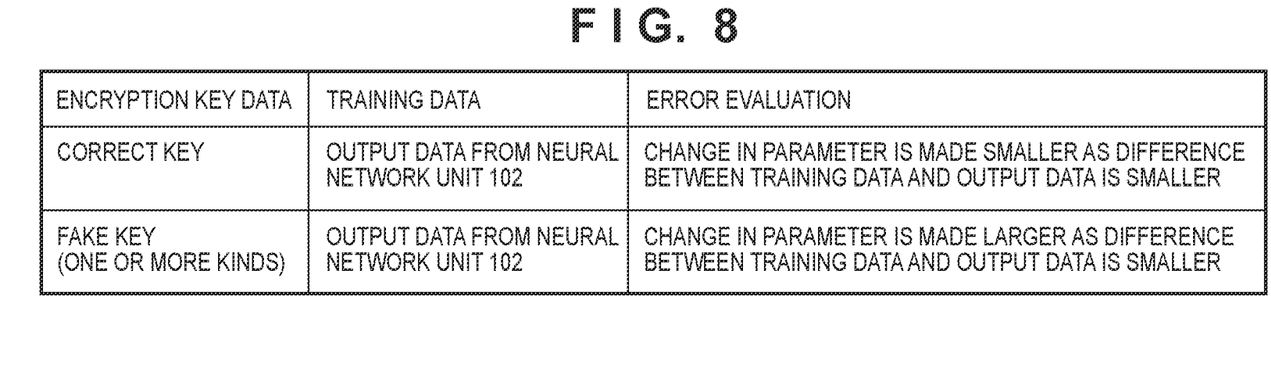
FIG. 8 is a flowchart of a learning method of a neural network unit according to a fourth embodiment.

FIG. 8 is a diagram showing an example of the learning method of the neural network unit 102 in this embodiment, and shows a table of encryption key data, training data, and error evaluation used in learning the neural network in the encryption apparatus 100.

Note that the error evaluation in this embodiment indicates how the difference between the output data of the neural network and the training data is reflected in changing parameters in the parameter optimization processing. In this embodiment, data before being encrypted is used as training data. Also, in the diagram showing the example of the learning method in this embodiment, the encryption apparatus 100 that performs super-resolution processing as processing different from the encryption processing shown in FIG. 7 of the third embodiment is used. Accordingly, training data used in this learning is image data which have undergone the super-resolution processing.

In general, if the difference between the output data of the neural network and the training data is small, then the parameters of the neural network are appropriate, so the amount of change in parameters is made small. Also in this embodiment, general parameter change processing is performed in learning in a case where the encryption key data in FIG. 8 is the correct key. Therefore, when the correct key is input, the neural network that outputs the super-resolution processing result can be learned.

On the other hand, in the present embodiment, learning is also performed using a fake key which is not the correct key as the encryption key data. At this time, the same training data for the correct key is used, but the error evaluation method is changed. In a case where the fake key is used, learning is performed so that the output image does not come close to the correct result, that is, the output image will be greatly different from the training data which is the result of the super-resolution processing. That is, the closer the difference between the training data and the output data is, the larger the parameter change rate is made. By learning with the fake key in this manner, an image that is significantly different from the training data is generated by using the fake key, and an effect of making the image data confidential is obtained.

As described above, according to the fourth embodiment, by inputting key data other than one correct key, it is possible to learn a neural network that anonymizes encryption target data.

Note that, as in the first embodiment, the training data for the fake key may be changed according to the key.

Fifth Embodiment

Next, a fifth embodiment of the present invention will be described. The fifth embodiment describes an encryption/decryption system including the encryption apparatus 100 according to any one of the first to fourth embodiments described above.

Figure 9:
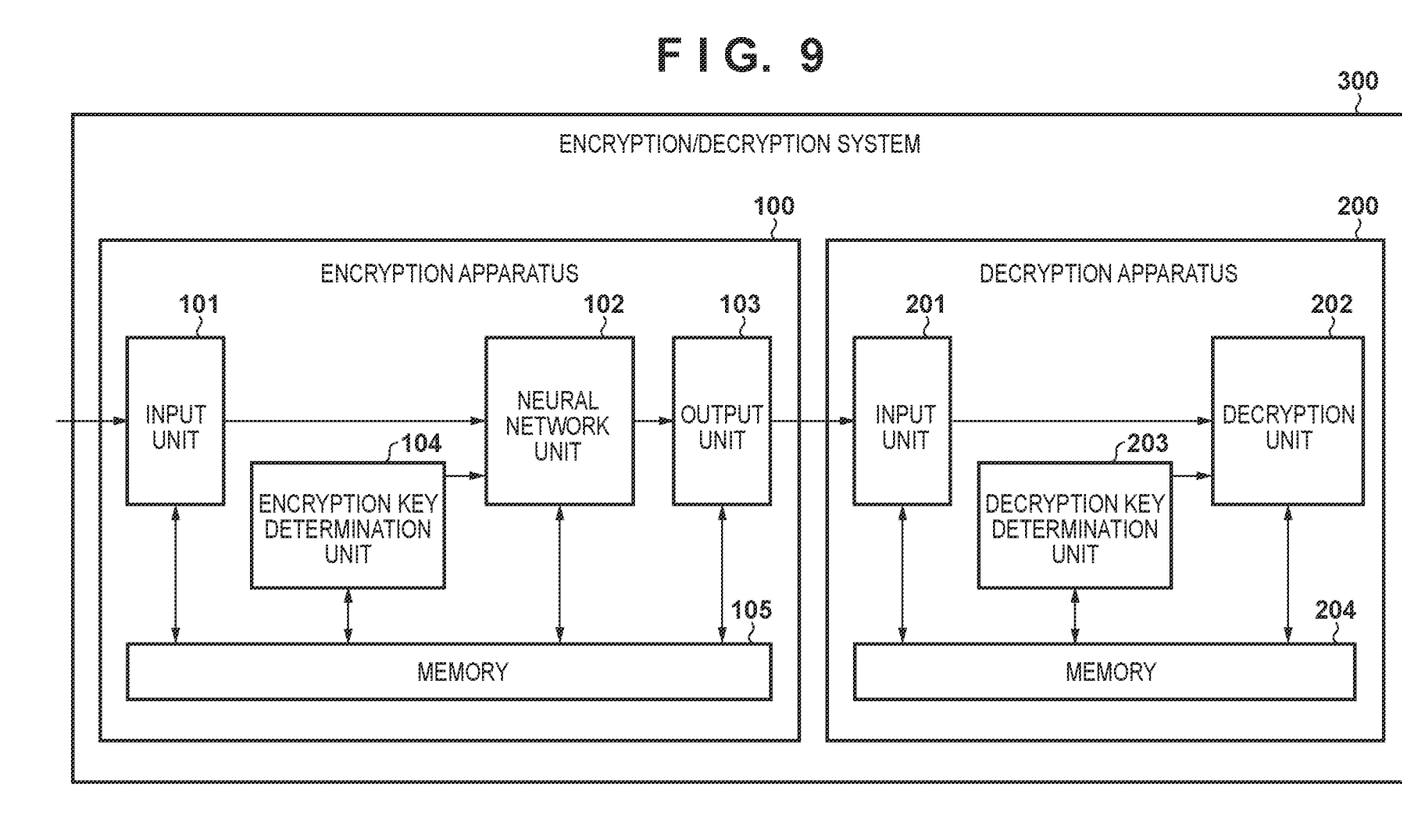
FIG. 9 is a block diagram showing a configuration of an encryption/decryption system according to a fifth embodiment.

FIG. 9 shows an encryption/decryption system 300 according to the fifth embodiment. The encryption/decryption system 300 represents a system including the encryption apparatus 100 and a decryption apparatus 200. It should be noted that the encryption apparatus 100 and the decryption apparatus 200 do not have to be included in one device, and for example, the encryption apparatus 100 may be arranged in an edge device such as a camera, and the decryption apparatus 200 may be arranged in a server device such as a cloud server.

The encryption apparatus 100 has a configuration similar to that shown in FIG. 1. It should be noted that the output unit 103 is assumed to be capable of outputting not only encrypted data but also encryption key data and decryption key information paired with the encryption key data from which the decryption apparatus 200 can infer the decryption key data. It is assumed that the decryption key information is held in the memory 105. Alternatively, the decryption key information may be the encryption key data itself.

The decryption apparatus 200 decrypts encrypted data encrypted by the encryption apparatus 100. An input unit 201 receives encrypted data transmitted from the encryption apparatus 100 and transmits it to a decryption unit 202. In the decryption apparatus 200, encrypted data is called decryption target data. A decryption key determination unit 203 determines decryption key data to be used for the decryption target data, and notifies the decryption unit 202 of it. The decryption unit 202 receives the decryption target data and decryption key data and generates decrypted data. In this embodiment, the decoding unit 202 is configured by a neural network.

A memory 204, like the memory 105 of the encryption apparatus 100, is a memory capable of storing information related to each process. In this embodiment, it will be explained so that each processing unit directly exchanges data with each other, however, the present invention is not limited to this, and the processing results of each processing unit may be temporarily stored in the memory 204 and each processing unit may obtain necessary data from the memory 204.

Determine Decryption Key

In this embodiment, the decryption key determination unit 203 uses decryption key information received from the encryption apparatus 100 to generate decryption key data. If the decryption key data is stolen, there is a risk that the decryption target data may be decrypted by a third party. Therefore, the decryption key determination unit 203 converts the decryption key information into decryption key data according to a predetermined table, and notifies the decryption unit 202 of the result. The decryption key information may be the decryption key data itself.

Neural Network Learning Method of Decryption Unit 202

Figure 10:
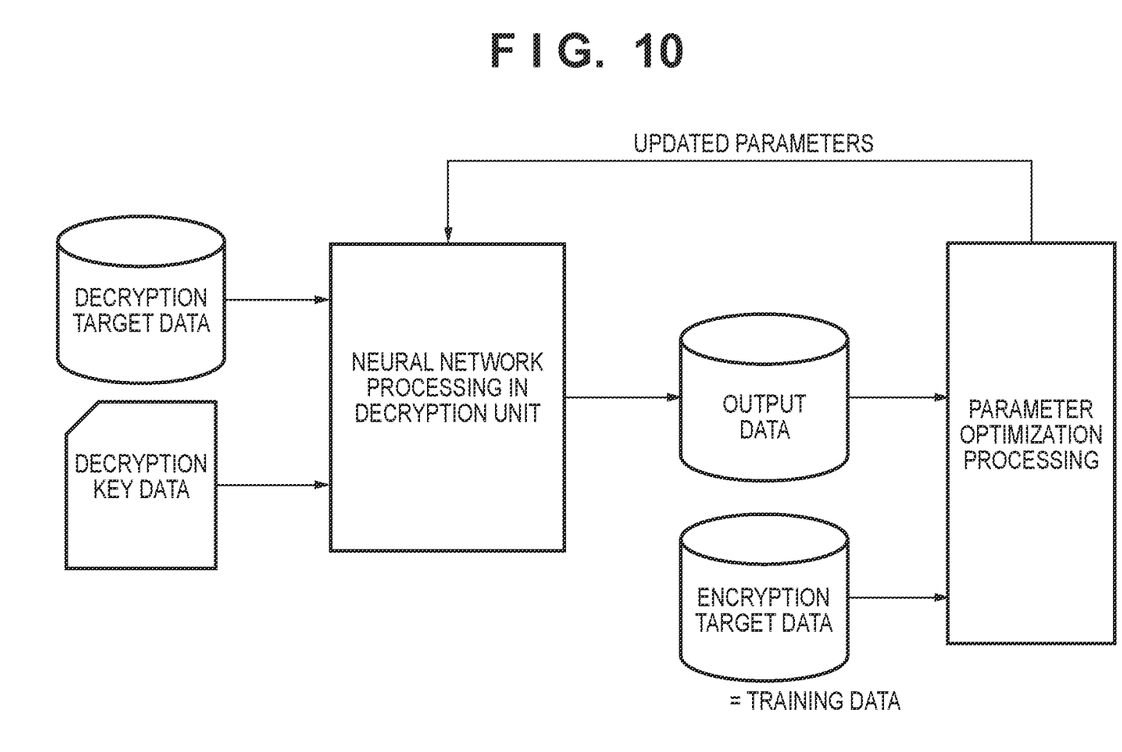
FIG. 10 is a diagram illustrating an example of a learning method of a decryption unit according to the fifth embodiment.

FIG. 10 is a diagram exemplifying the parameter learning method used in the neural network of the decryption unit 202. In this embodiment, it is assumed that the parameters used in the neural network are acquired in advance by performing learning on another device such as a personal computer (PC).

The neural network in FIG. 10 is equivalent to the configuration of the neural network used in the decryption unit 202 in FIG. 9, and parameters used in the decryption apparatus 200 are learned by this learning method. The learning method shown in FIG. 10 is the same as the learning method shown in FIG. 3 described in the first embodiment, and encryption target data and decryption key data are used as input data and the decryption target data is used as training data of the neural network processing performed in the decryption unit 202, thereby neural network processing in the decryption unit 202 is learned. In parameter optimization processing, the training data, which is desired encryption target data, is compared with output data of the neural network to optimize parameters.

As described above, according to the fifth embodiment, it is possible to decrypt encrypted data, and to configure a system capable of exchanging anonymized data.

In this embodiment, the decryption unit 202 is configured with a neural network that uses parameters learned in advance, however, the present invention is not limited to this, and rule-based decryption may be performed. In that case, a rule-based algorithm can be derived by repeating inverse calculations of the calculation contents of the neural network unit 102 of the encryption apparatus 100.

For example, assume that the neural network unit 102 uses the neural network generated by the learning method of the fourth embodiment, x is the encryption target data, and the encrypted data y and the fake key α are sent to the decryption apparatus 200. Let γ be the correct key. At this time, if the processing of the neural network unit 102 can be linearly separated like y=f(x)+α, the encryption target data is x=f(x)+γ, so x=y−α+γ can be derived.

The processing function of the neural network unit 102 described above is merely an example, and there is no limit to the processing function of the neural network as long as the encryption target data can be derived from the encrypted data y, the fake key α, and the correct key γ.

Sixth Embodiment

Next, a sixth embodiment of the present invention will be described. The encryption/decryption system 300 according to the sixth embodiment is the same as that shown in FIG. 9, so the explanation thereof is omitted here. A different point from the fifth embodiment is that the decryption key data is synchronized with the encryption key data.

In the fifth embodiment, the encryption apparatus 100 outputs the decryption key information and transmits it to the decryption apparatus 200. However, considering the processing load of outputting the decryption key information and the risk of interception, it is desired to avoid communicating the decryption key information from the encryption apparatus 100 to the decryption apparatus 200.

Accordingly, the encryption/decryption system 300 decides the timing of changing the encryption key data (predetermined conditions).

Figure 11:
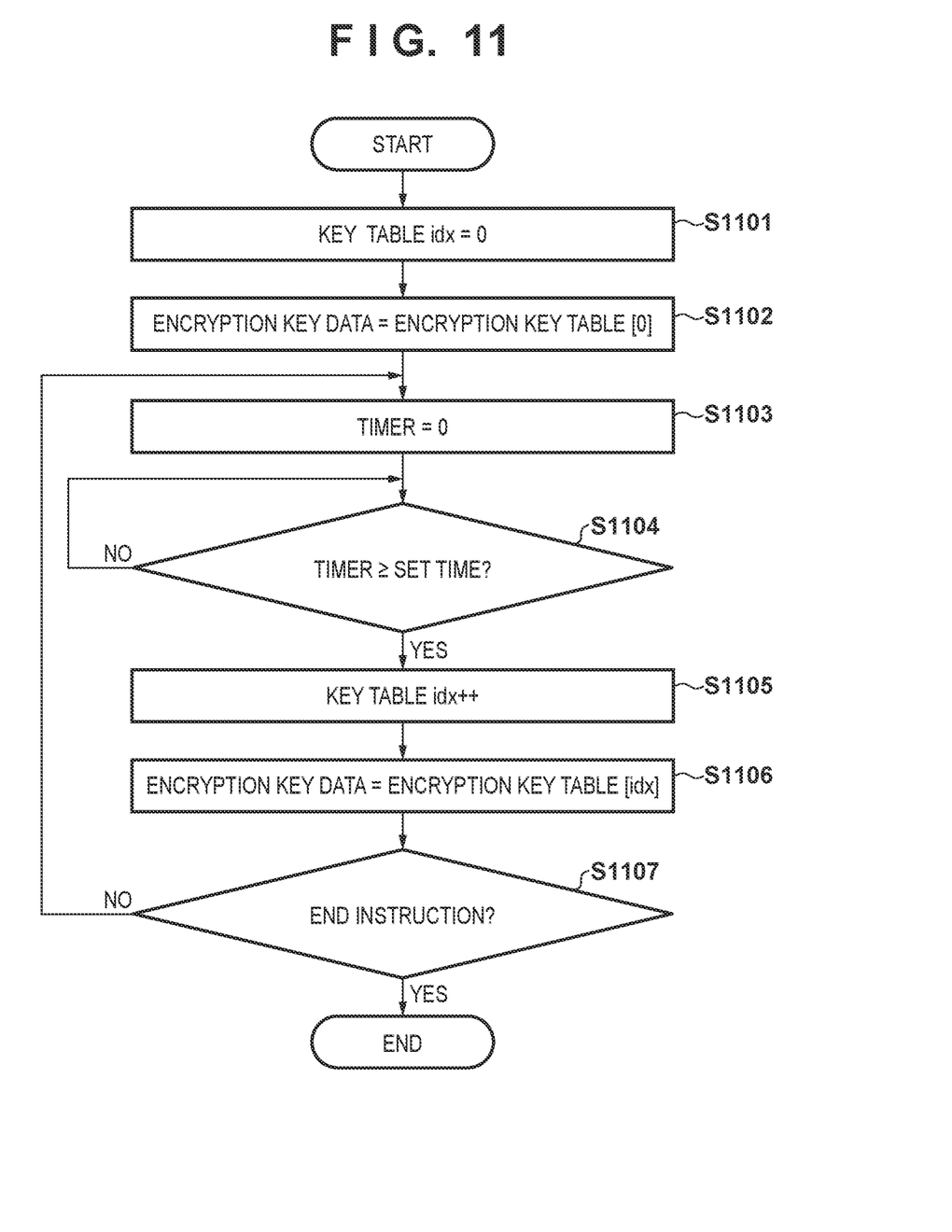
FIG. 11 is a flowchart of an encryption key determination method of an encryption key determination unit according to a sixth embodiment.

FIG. 11 illustrates a flowchart of an encryption key determination method in the encryption key determination unit 104 according to this embodiment.

First, in step S1101, the encryption key determination unit 104 initializes a key table idx to 0. In this embodiment, a plurality of encryption key data are assumed to be stored in a key table array, with one encryption key data per array element.

In step S1102, the encryption key determination unit 104 determines the encryption key data to be the 0th element of the encryption key table. That is, the encryption key data in the initial state is determined. It should be noted that it is not limited to start the encryption key data from the 0th element, and the encryption key data may be start from another element number.

In step S1103, the encryption key determination unit 104 sets the initial value of a timer to 0. In step S1104, if the encryption key determination unit 104 determines that the value of the timer is greater than or equal to the preset set time, the process advances to step S1105, otherwise the process of step S1104 is repeated.

In step S1105, the encryption key determination unit 104 increments the key table idx by one. In step S1106, the encryption key determination unit 104 determines the encryption key data to be the encryption key data stored in the idx element number of the encryption key table.

In step S1107, the encryption key determination unit 104 terminates the processing if there is an end instruction to end the processing of the encryption key determination unit 104, otherwise the process returns to step S1103 and repeats the above processes.

By doing so, for example, if the set time is 1 second, then the encryption key data can be changed every 1 second.

If the above mechanism is applied to the decryption key determination unit 203 of the decryption apparatus 200, the decryption key data can be determined at the same timing, and the decryption key data corresponding to the encryption key data can be determined without receiving the decryption key information.

However, this processing does not work unless the start time of the processing of the encryption key determination unit 104 and the start time of the processing of the decryption key determination unit 203 are synchronized. Accordingly, the start timing of the processing of the encryption key determination unit 104 shall be transmitted from the encryption apparatus 100 to the decryption apparatus 200 using the output unit 103 of the encryption apparatus 100.

As described above, according to the sixth embodiment, it is possible to configure a system capable of exchanging anonymized data without communicating decryption key information.

Note that parameters may be changed instead of encryption key data. For example, by using one encryption key data and changing parameters for each unit of time, different encryption may be performed for each unit of time to anonymize data. Similarly, a plurality of encryption key data and a plurality of parameter sets may be changed each unit of time.

Seventh Embodiment

Next, a seventh embodiment of the present invention will be described. The encryption/decryption system 300 according to the seventh embodiment is the same as that shown in FIG. 9, so the explanation thereof is omitted here. A different point from the sixth embodiment is the method of synchronizing the decryption key data and the encryption key data. In the sixth embodiment, the encryption key to be used is changed as a predetermined period of time has pass. On the other hand, in the seventh embodiment, the encryption key is changed according to the number of the encryption processing performed (predetermined condition).

Figure 12:
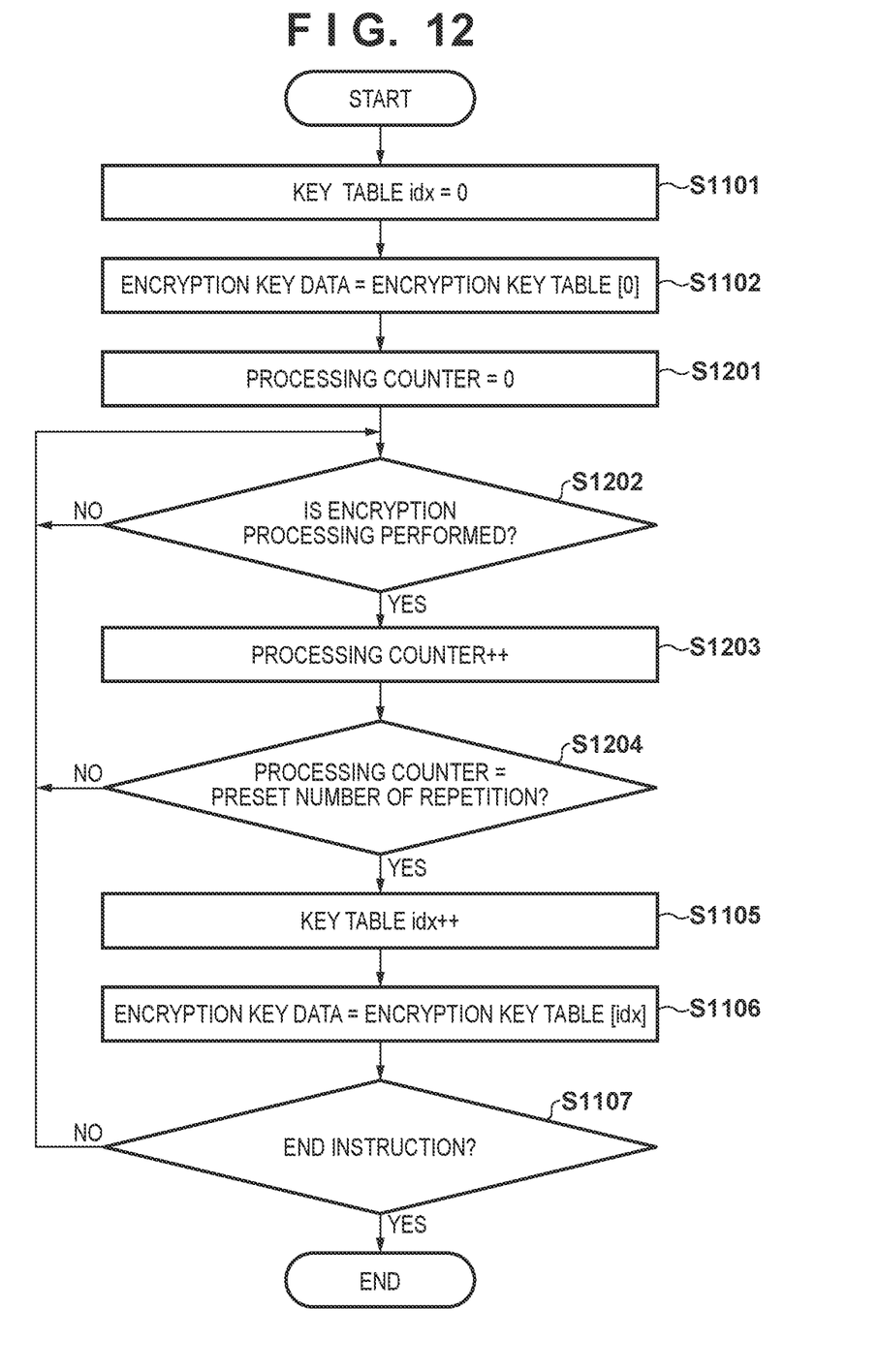
FIG. 12 is a flowchart of an encryption key determination method of an encryption key determination unit according to a seventh embodiment.

FIG. 12 shows a flowchart of an encryption key determination method used in the encryption key determination unit 104 according to this embodiment. In FIG. 12, the same step numbers are assigned to the same processes as those shown in FIG. 11, and the description thereof is omitted.

In step S1201, the encryption key determination unit 104 sets the initial value of a processing counter to 0. Then, in step S1202, it is determined whether or not encryption processing has been performed. If encryption processing has been performed, the process advances to step S1203 to increment the processing counter by 1; otherwise, the process returns to step S1202. In step S1204, if the encryption key determination unit 104 determines that the number of times of encryption processing, which is the number of times encryption has been performed by the encryption apparatus 100, is a preset number of repetition, the process proceeds to step S1105, otherwise the process returns to step S1202 to repeat the above processing.

By doing so, for example, if the number of repetition is set to 1, the encryption key data can be changed each time encryption processing is performed.

By applying the above method to the decryption key determination unit 203 of the decryption apparatus 200, the decryption key data can be determined at the same timing as described above, and the decryption key data corresponding to the encryption key data can be determined without transmitting the decryption key information.

However, if the initialization timing of the processing number counter of the encryption key determination unit 104 is not synchronized with the initialization timing of the processing number counter of the decryption key determination unit 203, this method will not work. Therefore, the initialization timing of the processing counter of the encryption key determination unit 104 shall be transmitted from the encryption apparatus 100 to the decryption apparatus 200 using the output unit 103 of the encryption apparatus 100.

As described above, according to the seventh embodiment, it is possible to configure a system capable of exchanging anonymized data without communicating decryption key information.

Note that parameters may be changed instead of encryption key data. For example, by using one encryption key data and changing the parameter every predetermined number of repetition, different encryption may be performed every predetermined number of repetition for anonymization. Similarly, a plurality of encryption key data and a plurality of parameter sets may be changed every predetermined number of repetition.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-032811, filed Mar. 3, 2022 which is hereby incorporated by reference herein in its entirety.

What is claimed is:

1. An encryption apparatus comprising one or more processors and/or circuitry which function as:
an encryption unit that encrypts target data, using the one or more processors and/or circuitry to encrypt, which is subjected to encryption using a neural network which is learned in advance and encryption key data, and generates encrypted data,
wherein the neural network further performs at least part of a first processing which is an image processing not related to the encryption of the target data, and encrypts the target data which has undergone the first processing such that a process different from an encryption processing and the encryption processing can be performed together by sharing a same neural network without unnecessary overhead so as to reduce data amount of the neural network used for anonymization.

2. The encryption apparatus according to claim 1, wherein the one or more processors and/or circuitry further function as an output unit that outputs the encrypted data, or the encrypted data and the encryption key data, or the encrypted data and information to be used for inferring the encryption key data.

3. The encryption apparatus according to claim 1, wherein the one or more processors and/or circuitry further function as a determination unit that determines the encryption key data,
wherein the determination unit determines the encryption key data to be used in the encryption by changing among a plurality of predetermined encryption key data according to a predetermined condition.

4. The encryption apparatus according to claim 3, wherein the predetermined condition is a lapse of preset time since the encryption key data was changed.

5. The encryption apparatus according to claim 3, wherein the predetermined condition is that a number of times of the encryption performed by the encryption unit since the encryption key data was changed is a predetermined number of times.

6. The encryption apparatus according to claim 1, wherein the encryption unit changes a parameter for the neural network among a plurality of predetermined parameters according to a predetermined condition.

7. The encryption apparatus according to claim 6, wherein the predetermined condition is a lapse of preset time since the parameter was changed.

8. The encryption apparatus according to claim 6, wherein the predetermined condition is that a number of times of the encryption performed by the encryption unit since the parameter was changed is a predetermined number of times.

9. The encryption apparatus according to claim 1, wherein the number of dimensions of the target data and the number of dimensions of the encryption key data are same.

10. The encryption apparatus according to claim 9, wherein a number of input layer of the neural network is one, and
wherein a concatenated data is obtained by concatenating the target data and the encryption key data is input to the encryption unit.

11. A encryption method comprising:
performing a first processing which is an image processing not related to encryption on target data which is subjected to encryption; and
generating encrypted data by encrypting the target data which has undergone the first processing using a neural network learned in advance and encryption key data such that a process diferent from an encryption processing and the encryption processing can be performed together by sharing a same neural network without unnecessary processing overhead so as to reduce data amount of the neural network used for anonymization.

12. A non-transitory computer-readable storage medium, the storage medium storing a program that is executable by the computer, wherein the program includes program code for causing the computer to function as an encryption apparatus comprising an encryption unit that encrypts encryption target data which is subjected to encryption using a neural network which is learned in advance and encryption key data, and generates encrypted data,     wherein the neural network further performs at least part of a first processing which is an image processing not related to the encryption of the target data, and encrypts the target data which has undergone the first processing such that a process different from an encryption processing and the encryption processing can be performed together by sharing a same neural network without unnecessary processing overhead so as to reduce data amount of the neural network used for anonymization.

* * * * *